United States Patent [19]

Reimer et al.

[11] Patent Number: 4,991,280
[45] Date of Patent: Feb. 12, 1991

[54] METHOD FOR REPLACING BOLTS ON CORE COMPONENTS IN NUCLEAR REACTORS

[75] Inventors: Gerd Reimer, Hoechstadt/Aisch; Reinhardt Strobel, Nuremberg; Lothar Werres, Langensendelbach; Alfred Gerstenhoefer, Nuremberg; Theo Kaeufl, Breitenbrunn; Anton Kautetzky, Forchheim; Ulrich Krippner, Vincenzenbronn, all of Fed. Rep. of Germany

[73] Assignee: Siemens Aktiengesellschaft, Munich, Fed. Rep. of Germany

[21] Appl. No.: 389,068

[22] Filed: Aug. 3, 1989

[30] Foreign Application Priority Data

Aug. 3, 1988 [DE] Fed. Rep. of Germany ....... 3826400

[51] Int. Cl.$^5$ ............................. B23P 6/00; B23P 19/04
[52] U.S. Cl. ............................... 29/402.06; 29/402.08; 29/407; 29/723
[58] Field of Search ................ 29/402.06, 402.08, 407, 29/525, 525.1, 723

[56] References Cited

U.S. PATENT DOCUMENTS 4,376,332 3/1983 Sandefur ........................ 29/402.08
4,748,733 6/1988 Hahn et al. ..................... 29/402.08

FOREIGN PATENT DOCUMENTS 1348051 10/1987 U.S.S.R. ........................... 29/402.06

OTHER PUBLICATIONS

Kerntechnik 52 (1988) No. 1, pp. 53–56; "Replacement of bolts" Ch. Hillrichs.

Primary Examiner—Timothy V. Eley
Attorney, Agent, or Firm—Herbert L. Lerner; Laurence A. Greenberg

[57] ABSTRACT

A method for replacing bolts on core components of nuclear reactors includes machining away a bolt fastened at an installation site in a core component as well as the entire fastening of the bolt with an electroerosion machine. Machined-away bolt material is removed and caught with a filter. The bolt is then ejected from the core component with a closed force system. The installation site of the bolt is remachined with an accurate fit and a new bolt is subsequently inserted. An apparatus for replacing bolts on core components of nuclear reactors includes rails. An auxiliary platform is supported on the rails on both sides of a reactor pressure vessel. An auxiliary crane is disposed on the auxiliary platform and adjustable transverse to the rails. A tool carrier is guided on the auxiliary platform and suspended from the auxiliary crane. A tool is disposed on the tool carrier for replacing bolts on core components.

14 Claims, 9 Drawing Sheets

METHOD FOR REPLACING BOLTS ON CORE COMPONENTS IN NUCLEAR REACTORS

The invention relates to a method for replacing bolts on core components or detachable core accessories in nuclear reactors, especially centering bolts in the upper grid plate in the core frame of a pressurized water reactor, in which the bolts are machined down by an electroerosion machine and machined-away bolt material is removed with a filter. The invention also relates to various apparatus that are particularly suitable for use in performing the method according to the invention.

A method of the above-mentioned type is known, for instance, from the journal "Kerntechnik" [Nuclear Engineering] 1988, No. 1, pp. 53–56. That method relates to the replacement of screws on detachable reactor pressure vessel accessories or components that are machined with an electroerosion machine in order to remove a weld seal used for fastening. Alternatively, chip-removing machining is referred to instead of machining with an electroerosion machine, but details of the machining are not provided.

It is accordingly an object of the invention to provide a method and apparatus for replacing bolts on core components in nuclear reactors, which overcome the hereinafore-mentioned disadvantages of the heretofore-known methods and devices of this general type, which keep the expense of the machining necessary for replacing bolts as low as possible, and which nevertheless assure that the replacement bolts meet every requirement of the installation location in terms of dimensional accuracy and strength.

With the foregoing and other objects in view there is provided, in accordance with the invention, a method for replacing bolts on core components or detachable core accessories of nuclear reactors, especially centering bolts disposed in an upper grid plate of a core framework of a pressurized water reactor, which comprises machining away a bolt fastened at an installation site in a core component as well as the entire fastening location of the bolt with an electroerosion machine, removing machined-away bolt material, catching the machined-away bolt material with a filter, subsequently ejecting the bolt from the core component with a closed force system, remachining the installation site of the bolt with an accurate fit, and subsequently inserting a new bolt.

According to the invention, the replacement of bolts requires that no more than slight force be exerted upon the detachable accessories or components of the core, in order to prevent their being damaged. These slight forces can be brought to bear in a precisely targeted manner by remote control. This is particularly important for centering bolts, which as is well known have the task of fixing the detachable accessories or components of nuclear reactors, including the fuel assemblies, in the desired position relative to one another. Fractions of a millimeter are crucial, even though the detachable accessories or components, such as the core frame of a pressurized water reactor, are structures which are several meters in size and weigh many tons, such as is discussed, for instance, in the book VGB-Kernkraftwerksseminar 1970 [Seminar on Nuclear Power Plants, German Association of Large Power Plant Operators], particularly at pages 33 and 35.

In accordance with another mode of the invention, there is provided a method which comprises machining away several tenths of a millimeter from the core component. This eliminates oxidation films that could hinder satisfactory seating of the replacement bolt.

In accordance with still another mode of the invention, there is provided a method which comprises comminuting chips produced during machining with a particle size greater than 1 mm to a particle size with a maximum of 1 mm.

In accordance with a further mode of the invention, there is provided a method which comprises inserting the new bolt with a press fit and monitoring the press fit by monitoring the pressing-in force.

In accordance with an added mode of the invention, in order to replace centering bolts in the upper grid plate of a core frame, there is provided a method which comprises disassembling a core component which is in the form of a grid plate, optionally as part of an upper core framework, along with the other core frame parts, from a reactor pressure vessel surrounding it, and positioning the grid plate on the pressure vessel before machining the bolt.

In accordance with an additional mode of the invention, there is provided a method which comprises disassembling the core component in the form of a grid plate of an upper core framework from a reactor pressure vessel on which it is supported with an intermediate frame therebetween, and positioning the grid plate on the pressure vessel before machining the bolt. This is done so that the upper core frame parts and grid plate are at the correct height with respect to the other equipment used for the work.

In accordance with yet another mode of the invention, there is provided a method which comprises pivoting the grid plate through 180° about a horizontal axis, prior to positioning the grid plate on the reactor pressure vessel. In this way the centering bolts to be replaced become readily accessible.

In accordance with yet a further mode of the invention, there is provided a method which comprises disassembling of parts the upper core framework having the grid plate from the reactor pressure vessel along with other core components located beneath them during operation and positioning the parts the upper core framework and the other core components next to the reactor pressure vessel, subsequently detaching the parts of the upper core framework from the other core components and positioning the parts of the upper core framework on the reactor pressure vessel with the intermediate frame therebetween, and subsequently simultaneously working on the upper grid plate and the other core components. This method is particularly economical. Due to the simultaneous machining, the shutdown time of the nuclear reactor can be reduced substantially.

In accordance with yet an added mode of the invention, there is provided a method which comprises grasping the upper grid plate over a large area with an inverting apparatus for swiveling, and positioning the grid plate along with the inverting apparatus on the reactor pressure vessel. This avoids undesirable deformation from forces exerted while transporting these parts.

For the sake of slight strains, the closed force system with which the bolt is forced out of the detachable core accessory in the invention is preferably constructed for an average bolt retaining force. In accordance with yet an additional mode of the invention, for a bolt in which the force available in this force system for forcing the bolt out is exceeded, there is provided a method which comprises expelling the bolt with a hammering tool.

In accordance with again another mode of the invention, there is provided a method which comprises drilling the bolt open before the hammer tool is applied to it, in order to lessen the retaining force.

With the objects of the invention in view there is also provided an apparatus for replacing bolts on core components of nuclear reactors, comprising rails, an auxiliary platform supported on the rails on both sides of a reactor pressure vessel, an auxiliary crane being disposed on the auxiliary platform and adjustable transverse to the rails, a tool carrier guided on the auxiliary platform and suspended from the auxiliary crane, and a tool disposed on the tool carrier for replacing bolts on core components. This apparatus permits accurate positioning of the tools with respect to the core accessories.

In accordance with another feature of the invention, there is provided a centering plate secured to the core component, at least one of the tool carrier and the tool being supported on the centering plate.

In accordance with a further feature of the invention, the tool carrier includes a hanger, and an actuating and locking unit for securing and centering the tool.

In accordance with an added feature of the invention, there are provided additional tools, the tools being successively disposed on the tool carrier in the following order: an eroding tool; an ejecting tool; a counterbore tool; a reaming tool; a pressing-in tool; a screwdriving tool; and a securing tool.

In accordance with an additional feature of the invention, the auxiliary platform has a bracket for suspending the tools.

In accordance with still another feature of the invention, there is provided a work bracket associated with the tool carrier and disposed next to the hanger bracket, the brackets being accessible by the auxiliary crane, so that the tools can be exchanged back and forth between the two brackets with the aid of the auxiliary crane.

Unlike the procedure described in the article in the journal "Kerntechnik", in accordance with a concomitant feature of the invention, the rails are part of a loading machine associated with a nuclear reactor, the auxiliary platform is movable on the rails, and there is provided supply equipment for the tools stationarily disposed outside the vicinity of the rails, and flexible lines connecting the supply equipment to the tool carrier.

This makes the auxiliary platform particularly small and lightweight, and correspondingly easy to assemble and disassemble. This is important particularly because the apparatus used for replacing the bolts cannot stay on the reactor during normal operation.

Other features which are considered as characteristic for the invention are set forth in the appended claims.

Although the invention is illustrated and described herein as embodied in a method and apparatus for replacing bolts on core components in nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 1:
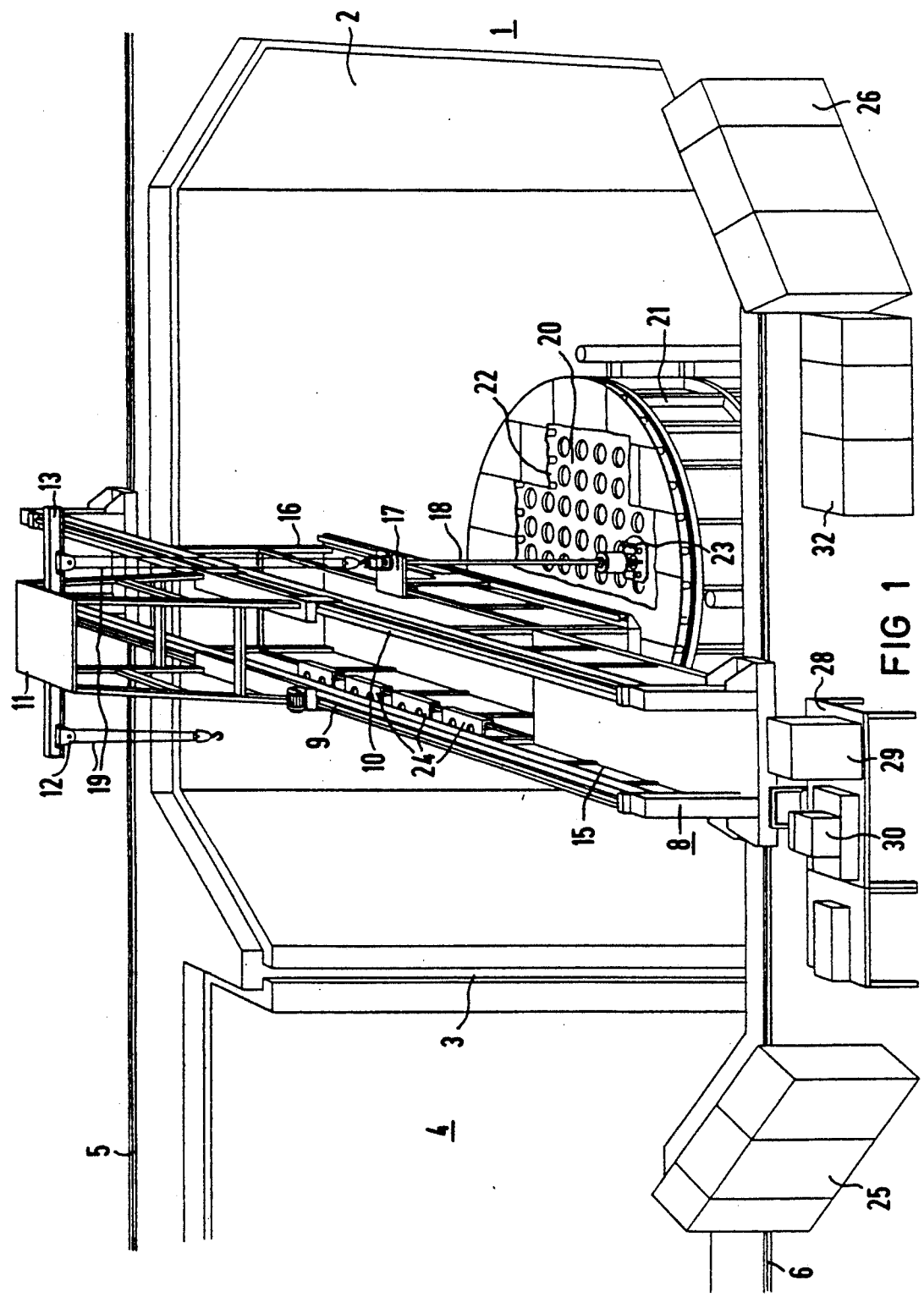
FIG. 1 is a fragmentary, diagrammatic, perspective view of an apparatus according to the invention.

Referring now to the figures of the drawing in detail and first, particularly, to FIG. 1 thereof, there is seen part of the interior of the containment building of a pressurized water reactor. A reactor pit 2 formed of concrete walls 1 communicates through an open sluice 3 with a fuel assembly storage well 4. An auxiliary platform 8 is movable on two parallel rails 5 and 6 which are laid on the concrete walls 1 on both sides of the reactor pit 2 and the fuel assembly storage well 4. The auxiliary platform 8 along with rails 9 and 10 thereof, in turn forms a track for an auxiliary crane system 11. The auxiliary crane system 11 has a trolley 12 with a travel path along a horizontal girder which is transverse to the auxiliary platform 8 and is approximately twice as long as the width of the auxiliary platform 8.

The bottom of the auxiliary platform 8 essentially includes two planes. A boarding area 15 is located above the rail 6. Adjoining the boarding area 15 is a work cage 16 at a lower level, which has a work bracket 17 on one side, that is the right side as seen in FIG. 1. A tool carrier 18 that is supported by the trolley 12 with a cable 19 is supported on the work bracket 17. The tool carrier 18 extends downward to an upper core framework or support structure 20, which is disposed in an invertible basket 21 and is inverted with it, in order to make the underside of an upper grid plate 22 accessible. A centering plate 23 is secured to the upper grid plate 22 and the lower end of the tool carrier 18 is fastened to the centering plate 23.

On the other side of the auxiliary platform 8, that is the left side as seen in FIG. 1, hanger brackets 24 for various tools are installed. The hanger brackets 24 will be described in further detail below. The hanger brackets 24 are also reachable with the trolley 12.

FIG. 1 clearly shows that beside the rails 5, 6, which are associated with a non-illustrated loading machine of the pressurized water reactor, supply equipment for the various tools is set up. Among this equipment is a cabinet 25 having an erosion generator, which supplies a non-illustrated eroding tool. A further cabinet 26 is provided for hydraulics and air supply to the tools of the auxiliary platform 8. The further cabinet 26 is located on the side of the auxiliary platform 8 remote or facing away from the erosion generator cabinet 25. Measuring instruments 29 and a computer area 30 are disposed on a workbench 28 set up between the cabinet 25 and the cabinet 26. An additional cabinet 32 contains small tools, spare parts and the like. These tools and parts are thus readily accessibly placed in the vicinity of the auxiliary platform, without putting any additional strain on the structure of the auxiliary platform. The hydraulic supply and the erosion generator can be connected to the tools through non-illustrated flexible lines.

Figure 2:
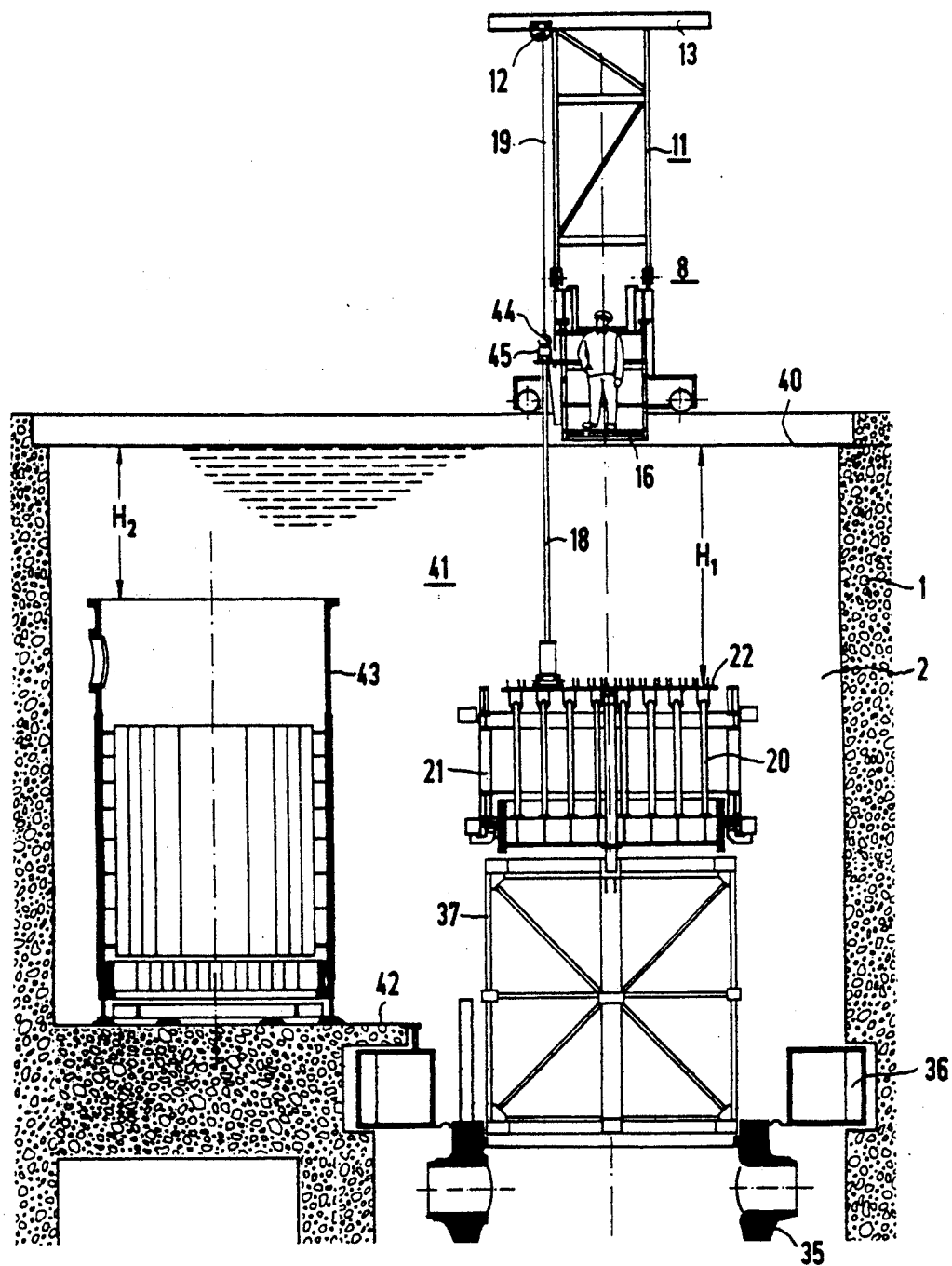
FIG. 2 is a vertical-sectional view of the apparatus according to the invention as shown in FIG. 1, during operation.

In FIG. 2 shows that a reactor pressure vessel 35 is suspended in the reactor pit 2 with a box girder 36. An intermediate frame 37 is positioned on the reactor pressure vessel 35, and the invertible basket 21 having the upper core framework 20 rests on the intermediate frame 37. It can be seen that the upper edge of the core framework 20 is disposed below the surface or level 40 of basin water 41 by a height or distance $H_1$ which may be 3 m, for example. A core container 43 positioned next to the reactor pressure vessel 35 on a landing 42 is also covered on the top thereof with a layer of water having a height $H_2$ of 2 m, for example, which acts as a shield for radioactive reactor components or accessories. Work can be simultaneously performed on both accessories or components 20, 43.

Figure 3:
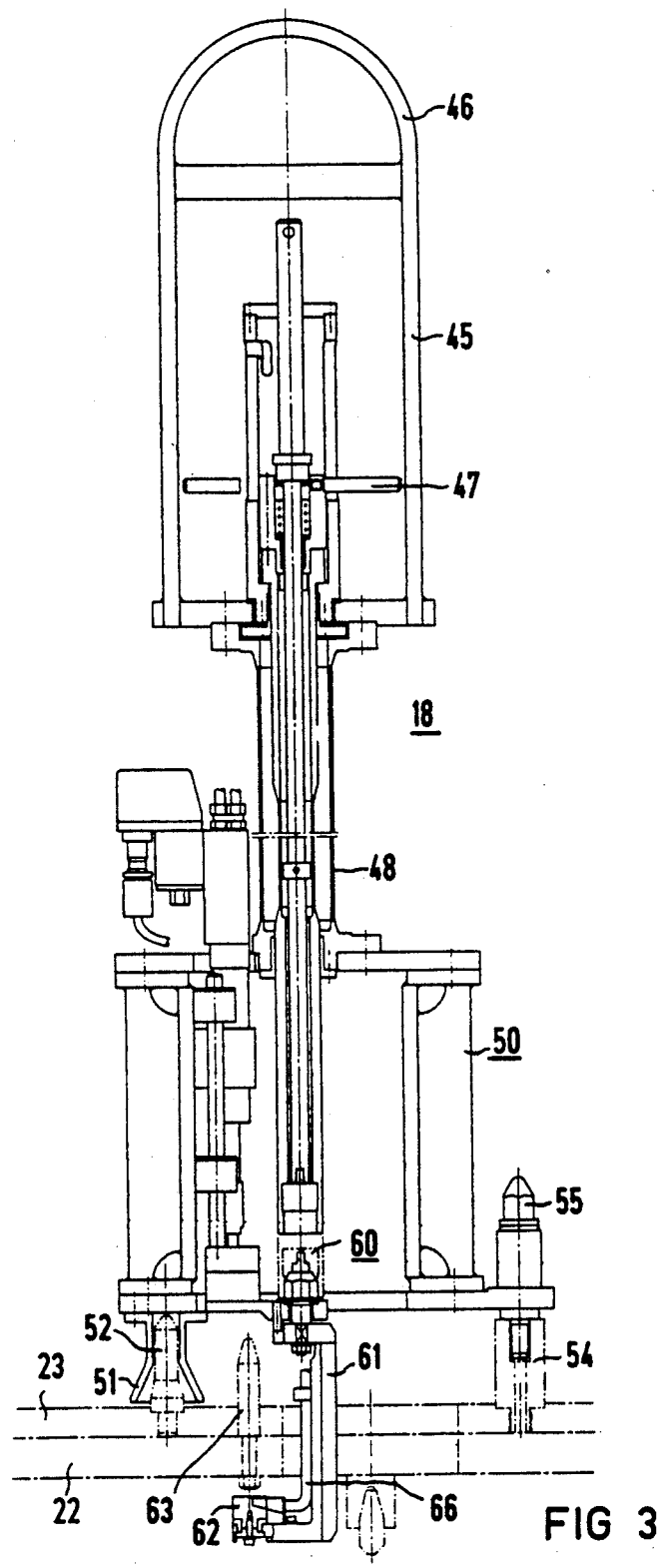
FIG. 3 is a side-elevational view of an eroding tool on a reduced scale.

It can also be seen in FIGS. 2 and 3 that a hanger 45 of the tool carrier 18 is readily accessible from the work cage 16. The tool carrier 18, which is shown on a larger scale in FIGS. 3–9, includes the hanger 45 which has an upper hoop 46 that is engaged by a hook 44 of the trolley 12. An actuating and locking unit 47 is attached to the hanger 45 and through a retaining rod 48 carries a frame 50. The frame 50 has centering sockets 51, which open out at the bottom like funnels and are seated on centering bolts 52 of the centering plate 23 shown in phantom in FIG. 3. Threaded bushings 54 into which fastening screws 55 can be screwed, are seated in the centering plate 23, so that the frame 50 is firmly joined to the centering plate 23.

An erosion tool 60 shown in FIG. 3 includes a pivotable electrode holder 61, with an eroding electrode 62 disposed at the lower end thereof. The electrode 62 can be positioned at a centering bolt 63 which is shown in phantom, so that the fastening of the bolt 63 in the upper grid plate 22 can be removed completely by the electroerosion process. Suction means 66 aspirate the waste produced during the erosion into a non-illustrated filter, so as to prevent soiling of the basin water 41.

Figure 4:
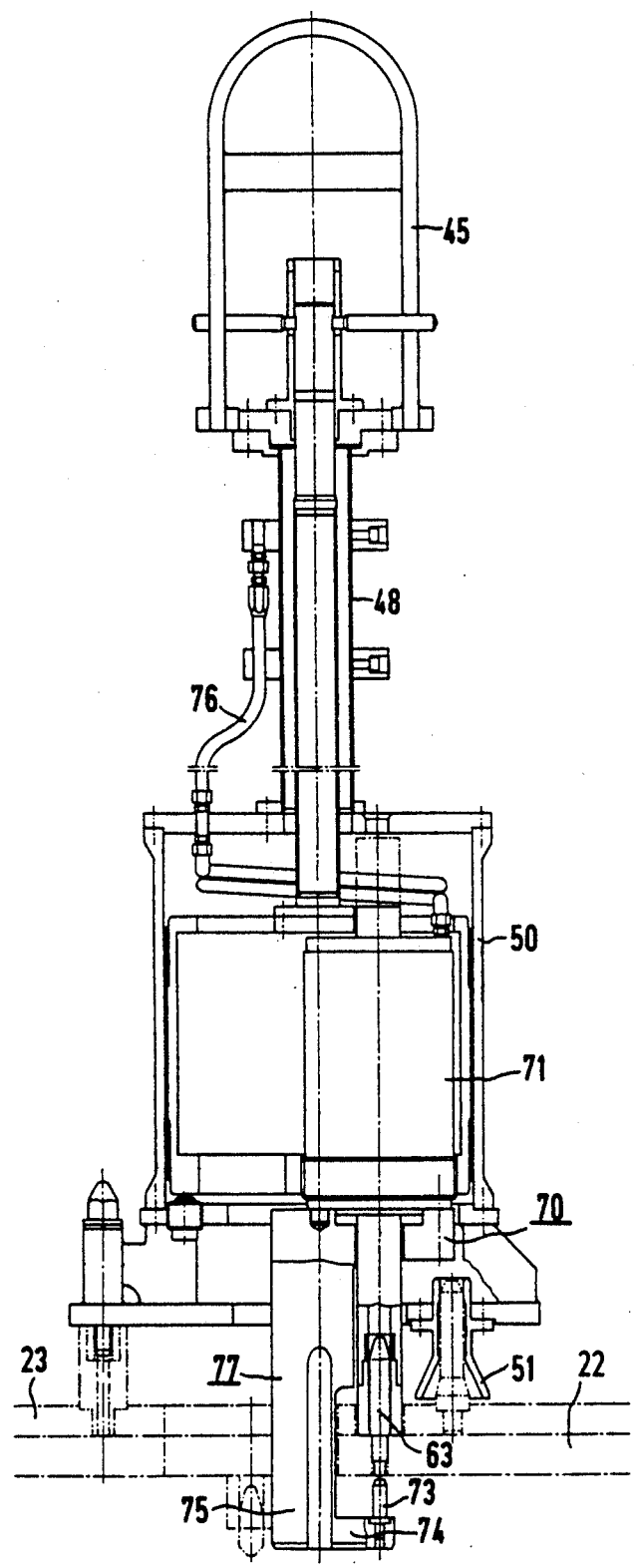
FIG. 4 is a side-elevational view of an ejector tool.

In an ejector tool 70 shown in FIG. 4, a hydraulic cylinder 71 is secured on the hanger 45 with the retaining rod 48 and the frame 50. The centering bolt 63 which has been machined away from the grid plate 22 by electroerosion, can be ejected with the ejector tool 70. An ejector pin 73 is seated on an arm 74 of a hoisting member 75, which is adjustable with the cylinder 71, resulting in a closed force system 77 which does not strain the grid plate 22 during operation. A hydraulic line 76 of the cylinder 71 is shown only up to the vicinity of the hanger 45. From there, it extends with flexible lines to the cabinet 26 shown in FIG. 1.

Figure 5:
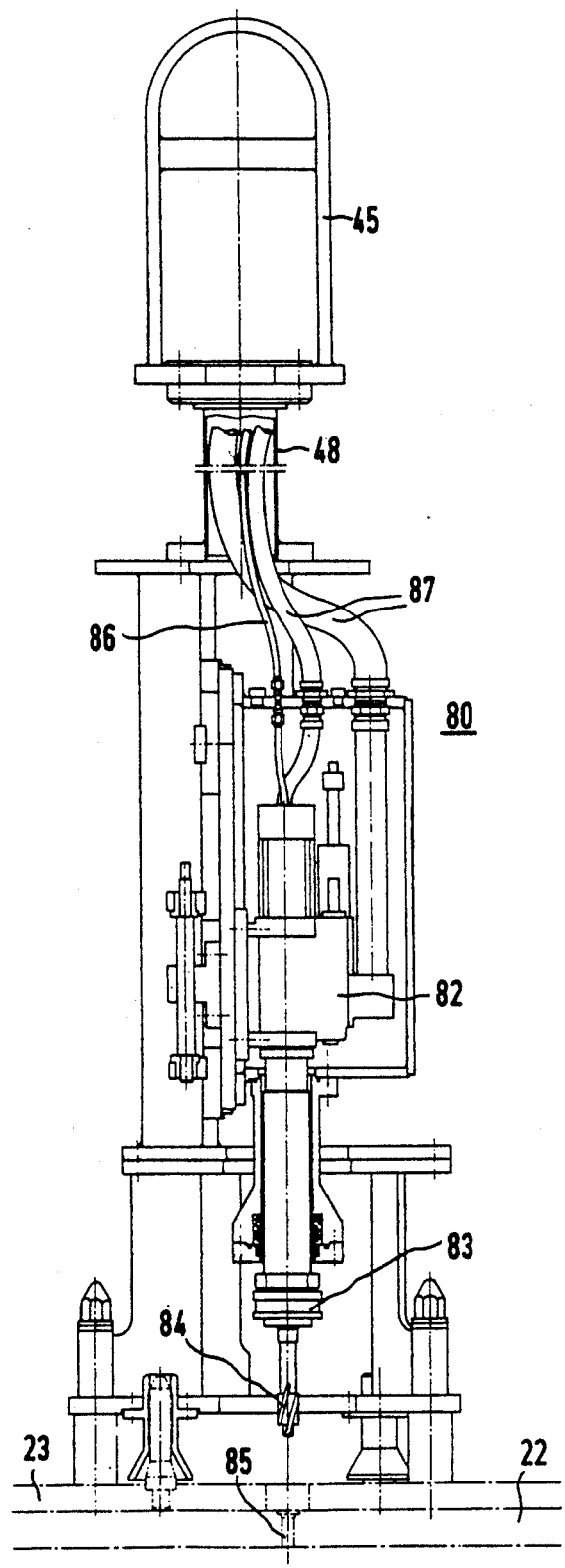
FIG. 5 is a side-elevational view of a counterbore tool.

In a counterbore 80 shown in FIG. 5, a pneumatically actuated feed unit 82 is attached to the hanger 45 with the retaining rod 48. The lower end of the feed unit 82 has a tool socket 83 thereon, into which a countersinking tool 84 is inserted. After the expulsion of the centering bolt 63, the countersinking tool 84 machines a bore 85 in the grid plate 22, in order to obtain an accurate fit for the installation of a replacement bolt. The feed unit 82 is actuated partly pneumatically and partly hydraulically. Flexible lines 86 and 87 that lead to the cabinet 30 can be seen in this case in the vicinity of the retaining rod 48.

Figure 6:
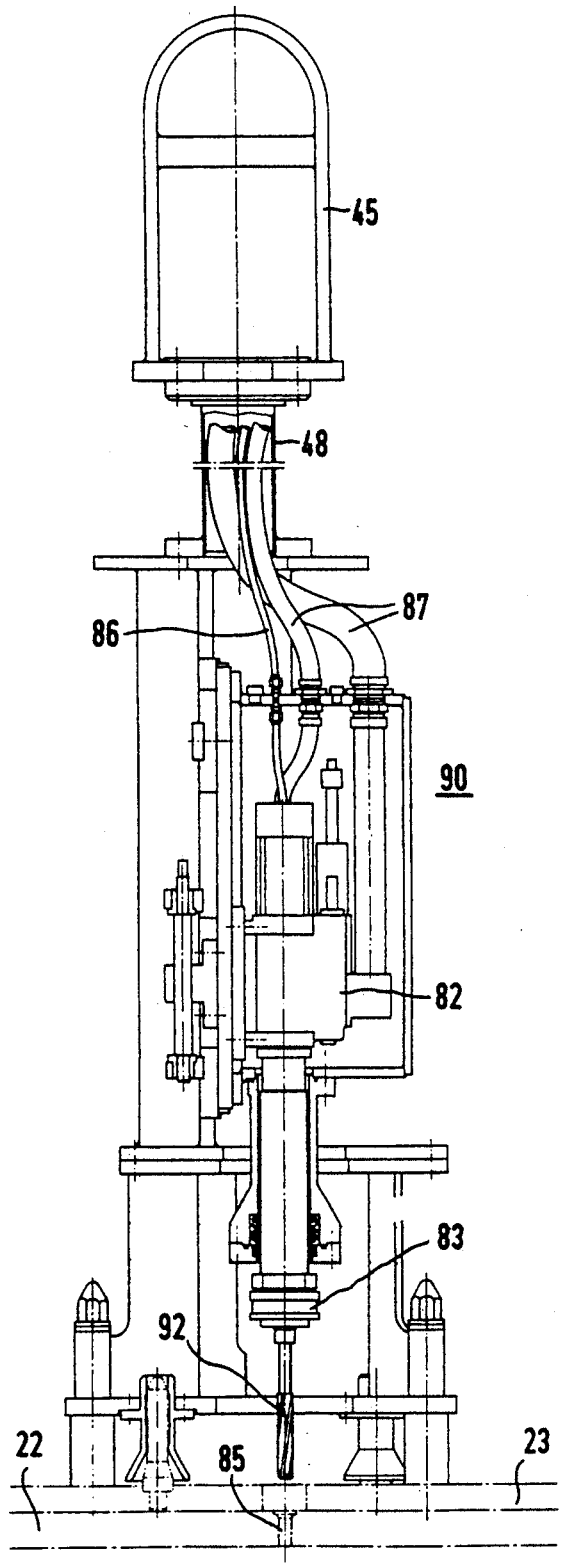
FIG. 6 is a side-elevational view of a reaming tool.

In the case of a reaming tool 90 shown in FIG. 6, the feed unit 82 having the tool socket 83 is secured to the hanger 45 with the retaining rod 48. A special reamer 92 with which the bore 85 in the grid plate 22 is remachined, is disposed in this tool socket 83.

Figure 7:
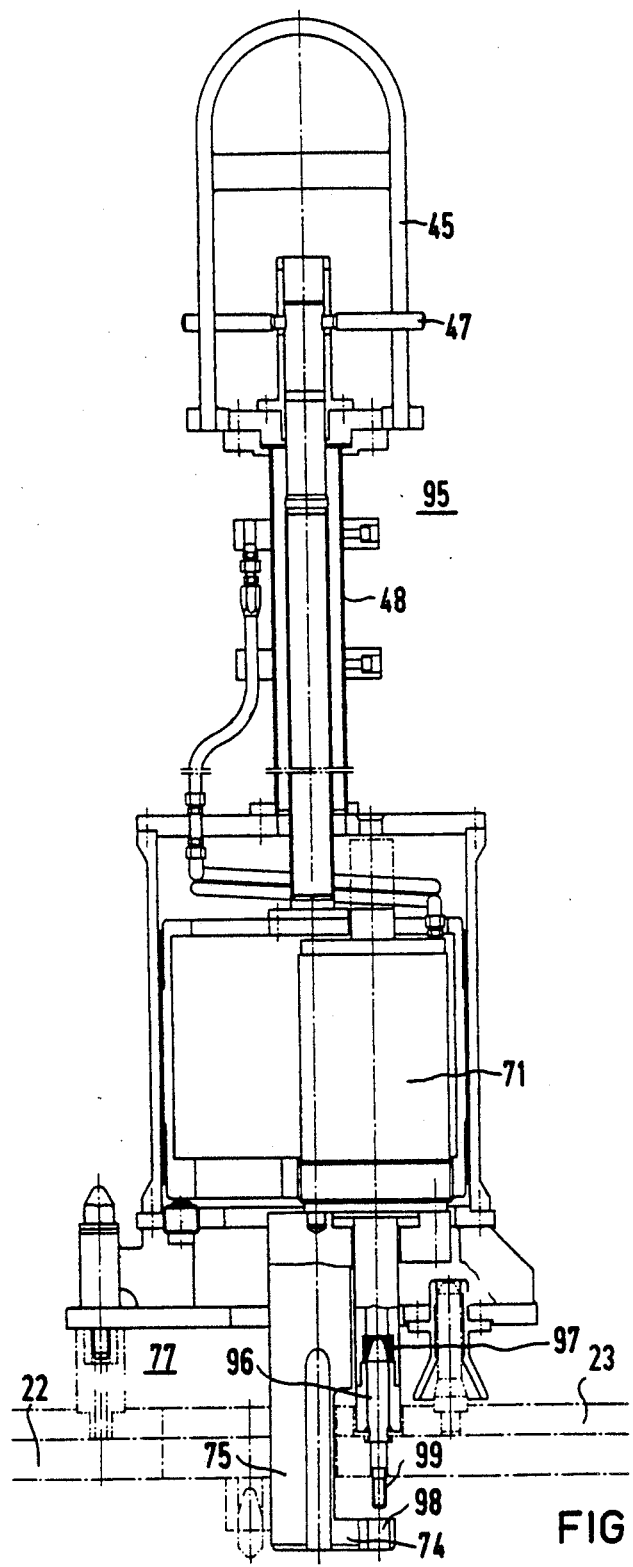
FIG. 7 is a side-elevational view of a pressing-in tool.

The closed force system 77 of the ejector tool 70 of FIG. 4 is used with a pressing-in tool 95 of FIG. 7 to insert a new centering bolt 96. During operation of the device shown in FIG. 7, the cylinder 71 exerts a force upon the centering bolt 96 through a pressure pad 97 adapted to the bolt, that is sufficient for a press fit. The hoisting member 75 having the arm 74 serves as a countersupport in this case. A threaded tang 99 of the centering bolt 96 is pressed into a bore 98.

Figure 8:
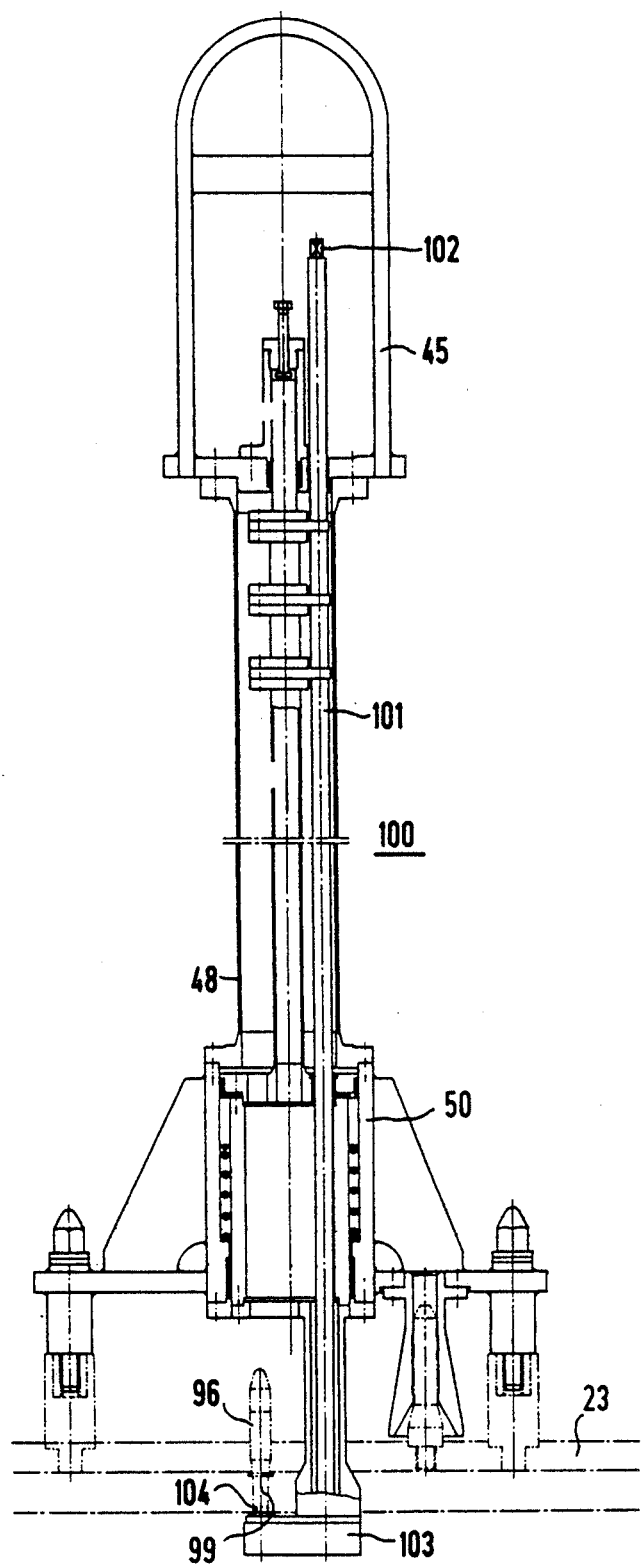
FIG. 8 is a side-elevational view of a screwdriver tool.

In a screwdriving tool 100 of FIG. 8, a screwdriver shank 101 which is accommodated in the retaining rod 48, has a flat surface 102 on the upper end thereof for engagement by a torque wrench. The torque wrench can actuate a screw head 103 which screws a nut 104 onto the threaded tang 99 of the centering bolt 96 from below. The screw head is secured to the frame 50, which in turn is centered and secured to the centering plate 23.

Figure 9:
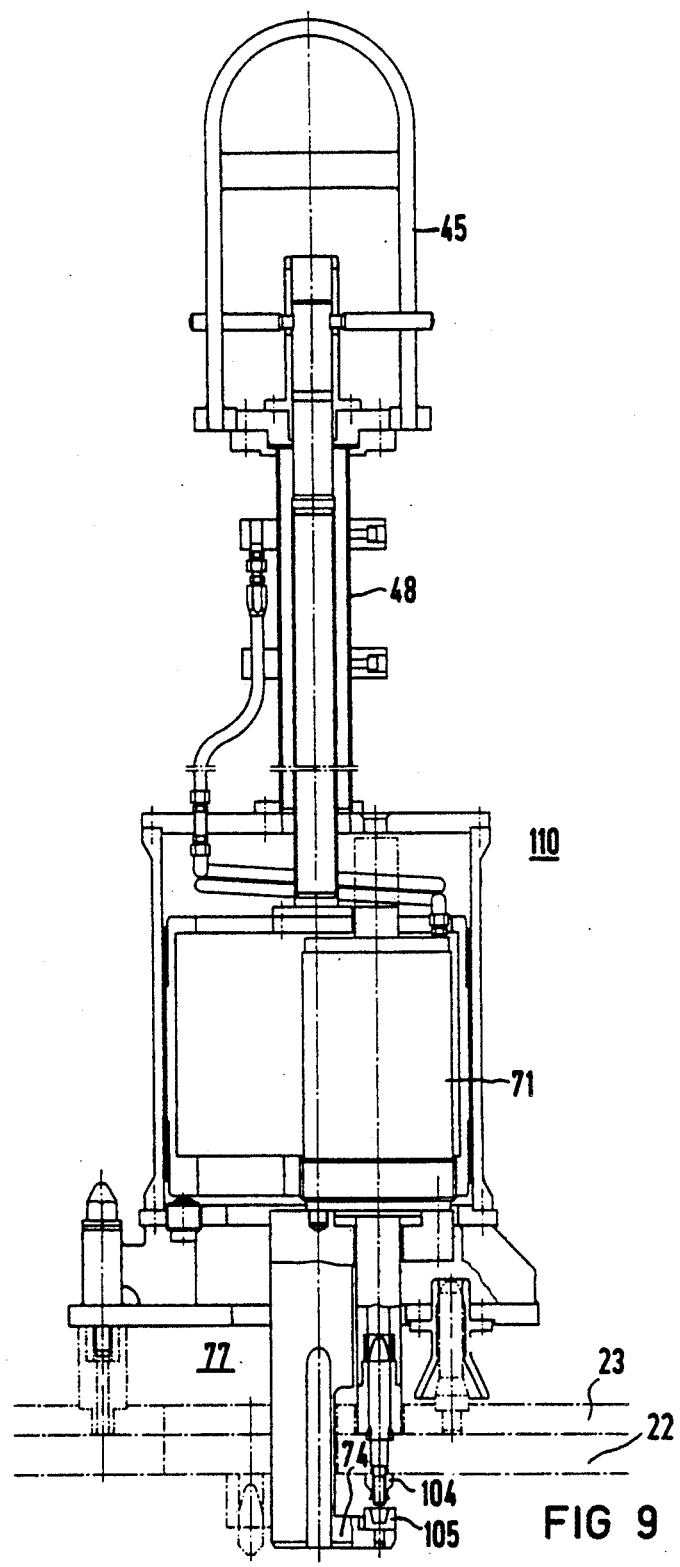
FIG. 9 is a side-elevational view of a securing tool.

A securing tool 110 of FIG. 9 uses the hydraulic drive 71 of the closed force system 77 to crush the lower edge of the nut 104 with a pressure pad 105 attached to the arm 74. This secures the nut 104 against unintentional loosening.

We claim:

1. Method for replacing a bolt in an installation site of a core component with two sides in a nuclear reactor, the bolt having a first end with a bolt head at one side of the core component and a second end with a screw thread and a nut secured to the screw thread at the other side of the core component, which comprises
  (a) machining away the second bolt end and the nut with an electroerosion machine to obtain a remaining bolt piece,
  (b) catching machined-away bolt material with a filter for removing the machined-away bolt material,
  (c) subsequently ejecting the remaining bolt piece from the core component with a closed force system,
  (d) re-machining the installation site of the bolt, and
  (e) subsequently inserting a new bolt.

2. Method according to claim 1, which comprises machining away several tenths of a millimeter from the core component.

3. Method according to claim 1, which comprises comminuting chips produced during machining with a particle size greater than 1 mm to a particle size with a maximum of 1 mm.

4. Method according to claim 1, which comprises inserting the new bolt with a press fit.

5. Method according to claim 4, which comprises monitoring the press fit by monitoring the pressing-in force.

6. Method according to claim 1, which comprises disassembling the core component in the form of a grid plate from a reactor pressure vessel surrounding it, and positioning the grid plate on the pressure vessel before machining the bolt.

7. Method according to claim 6, which comprises pivoting the grid plate through 180° about a horizontal axis, prior to positioning the grid plate on the reactor pressure vessel.

8. Method according to claim 7, which comprises grasping the grid plate over a large area with an inverting apparatus for swiveling, and positioning the grid plate along with the inverting apparatus on the reactor pressure vessel.

9. Method according to claim 1, which comprises disassembling the core component in the form of a grid plate of an upper core framework from a reactor pressure vessel surrounding it, and positioning the grid plate on the pressure vessel before machining the bolt.

10. Method according to claim 1, which comprises disassembling the core component in the form of a grid plate of an upper core framework from a reactor pressure vessel on which it is supported with an intermediate frame therebetween, and positioning the grid plate on the pressure vessel before machining the bolt.

11. Method according to claim 10, which comprises disassembling of parts the upper core framework having the grid plate from the reactor pressure vessel along with other core components located beneath them during operation and positioning the parts the upper core framework and the other core components next to the reactor pressure vessel, subsequently detaching the parts of the upper core framework from the other core components and positioning the parts of the upper core framework on the reactor pressure vessel with the intermediate frame therebetween, and subsequently simultaneously working on the grid plate and the other core components.

12. Method according to claim 1, which comprises expelling the bolt with a hammering tool if the force of the closed force system available for the ejection is exceeded.

13. Method according to claim 12, which comprises drilling the bolt open before the application of the hammering tool.

14. Method according to claim 1, which comprises machining away a centering bolt disposed in an upper grid plate of a core framework of a pressurized water reactor.

* * * * *